(12) United States Patent
Miller et al.

(10) Patent No.: US 8,412,854 B2
(45) Date of Patent: Apr. 2, 2013

(54) SECURE COMMUNICATION PORT REDIRECTOR

(75) Inventors: Daryl R. Miller, Rancho Santa Margarita, CA (US); David A. Garrett, Orange, CA (US)

(73) Assignee: Lantronix, Inc., Irvine, CA (US)

( * ) Notice: Subject to any disclaimer, the term of this patent is extended or adjusted under 35 U.S.C. 154(b) by 218 days.

(21) Appl. No.: 12/639,855

(22) Filed: Dec. 16, 2009

(65) Prior Publication Data

US 2010/0095027 A1    Apr. 15, 2010

Related U.S. Application Data

(63) Continuation of application No. 10/929,858, filed on Aug. 30, 2004, now Pat. No. 7,660,910.

(51) Int. Cl.
*G06F 3/00*     (2006.01)
(52) U.S. Cl. ............................................. 710/2
(58) Field of Classification Search ..................... 710/2
See application file for complete search history.

(56) References Cited

U.S. PATENT DOCUMENTS

| | | | |
|---|---|---|---|
| 5,651,114 A * | 7/1997 | Davidson, Jr. ................. | 709/229 |
| 5,717,691 A | 2/1998 | Dighe et al. | |
| 6,047,319 A | 4/2000 | Olson | |
| 6,112,260 A | 8/2000 | Colterjohn et al. | |
| 6,134,591 A | 10/2000 | Nickles | |
| 6,141,706 A | 10/2000 | Thornton et al. | |
| 6,195,359 B1 | 2/2001 | Eng et al. | |
| 6,442,169 B1 * | 8/2002 | Lewis ............................. | 370/401 |
| 7,286,476 B2 * | 10/2007 | Helmy et al. ................. | 370/230.1 |
| 2009/0060199 A1 * | 3/2009 | von Mueller et al. ......... | 380/278 |
| 2010/0031340 A1 * | 2/2010 | Batke et al. .................... | 726/13 |
| 2010/0251269 A1 * | 9/2010 | Remmert ....................... | 719/328 |

OTHER PUBLICATIONS

Tactical Software, LLC, COM/IP Redirector User Guide, Jun. 20, 2004, Chapter 1, 3, Appendix A.
HelloDevice Pro Series User Guide, Jun. 24, 2003, Sena Technologies, Inc. Version 1.0.05, p. 1-68.
Winfried Hofacker, Microcomputer Hardware Handbook, Ing. W. Hofacker GmbH, 1st edition, pp. 487-494.

* cited by examiner

*Primary Examiner* — Henry Tsai
*Assistant Examiner* — Juanito Borromeo
(74) *Attorney, Agent, or Firm* — Fish & Associates, PC

(57) ABSTRACT

A method and system that allows a host system application to securely communicate with a legacy device is provided. A redirector software module receives data that is destined for a host system serial COM port. Data is secured and re-directed to a legacy device via a network port instead of the serial COM port. Conversely, data destined for the host system is provided to a device server via a server COM port by the legacy serial device. The data can be encrypted and sent to the host system via the network. The redirector software module decrypts the encrypted data and presents it to the consumer application as if the data had arrived via the local COM port.

12 Claims, 8 Drawing Sheets

SECURE COMMUNICATION PORT REDIRECTOR

CROSS REFERENCE TO RELATED APPLICATIONS

This patent application is a continuation application which claims priority to U.S. patent application Ser. No. 10/929,858 which has a filing dated of Aug. 30, 2004.

BACKGROUND

1. Field of the Invention

The present invention relates to computing systems, and more particularly, to secured communication between a host system and a legacy device.

2. Related Art

Users of serial devices often have the need to remotely communicate with host computing systems (for example, a personal computer, a set top box, laptop computer, notebook computer or any other computing device, collectively referred to as a "PC" throughout this specification) to extend the distance between the devices and their hosts beyond that provided using, for example, an RS232 cable. The desired remote distance may span the length of an office building or even a continent.

Access to remote serial devices has been limited, since it was often necessary to physically connect a computer or PC to the serial device to download data. Fortunately, the advent of the Internet/network computing provided a method for providing remote communications. A demand arose to Internet enable older serial devices (may also be referred to as "legacy devices") by creating products that have a serial port and an Ethernet port, and which can accept data from the legacy devices and send the data over the Internet. Legacy devices may include a stand-alone vending machine, a microwave, a dishwasher or any other device that lacks basic computing ability. Alternatively, legacy devices can include devices that require significant computing capabilities, such as a FAX machine, a copier, a printer and the like.

Today the creation of device server technology in embedded systems allows users to place legacy serial devices on to Ethernet networks, and thus, the Internet, with minimal effort and with limited knowledge of networking on the part of the user.

Unfortunately, the Internet has proved to be a risky place to operate; especially when transferring sensitive data. Security has become a necessity for legacy serial devices operating over the Internet.

Many consumer applications and legacy serial devices are designed to communicate via a local serial communication port (a "COM" port) on a PC and are therefore network incompatible, without extensively rewriting or otherwise replacing the communications applications to make the legacy serial devices network intelligent. These applications also do not have the means to secure data.

Therefore, there is a need for an efficient, low cost system and method for providing secured communication with a legacy device without altering legacy device drivers or the applications that are designed to communicate with legacy devices.

SUMMARY OF THE INVENTION

The present invention provides a method and associated system that receives data from an application, and re-directs the data to a legacy device via a network port. Data may be encrypted before it is sent out via the network port. The application is not aware of the "redirection" of data. This allows consumer applications on a user's PC to securely communicate with legacy devices without requiring the consumer applications to be rewritten/upgraded.

In one aspect of the present invention, a communication port redirector software module resides on a PC. The redirector software module can redirect the consumer application data otherwise destined for a local serial communication port (hereinafter "local COM port" or "serial COM port") on the user's PC to a network port. Beneficially, the redirector software module can include the capability to encrypt or decrypt using an encryption algorithm.

Instead of traversing through the local COM port, the consumer application data is transmitted across the Ethernet network using, for example, TCP/IP. Advantageously, the redirection is transparent to the consumer application, which continues to perform as if it were communicating to the PC local COM port.

The redirected data is directed to the device server on the network. The device server is capable of decrypting the data and presenting to the legacy device via a local server serial COM port (hereinafter "server COM port").

Conversely, data provided to the device server via the server COM port from the attached legacy serial device can be encrypted and directed back to the consumer application on the remote PC via the network to the redirector software module. The redirector software module decrypts the data and presents to the consumer application as if the data had arrived via the local COM port.

The redirector software module of the present invention eliminates the need for consumers to modify or redesign their communication applications in order to obtain secure data transmission over inherently unsecured data flow paths, such as the Internet. The present invention does not require a knowledge or understanding of how to develop networks or how to implement encryption software.

Additional advantages, objects, and features of the invention will be set forth in part in the detailed description which follows. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The accompanying drawings are included to provide further understanding of the invention, illustrate various embodiments of the invention, and together with the description serve to explain the principles and operation of the invention. In the drawings, the same components have the same reference numerals. The illustrated embodiment is intended to illustrate, but not to limit the invention. The drawings include the following Figures.

DETAILED DESCRIPTION

A method and system are provided for securing and re-directing data from an application that is designed to communicate via a local COM port. Data is secured and transmitted via a network port, instead of the local COM port. Accordingly, the present description of the embodiments is not to be taken in a limiting sense but is made merely for the purpose of describing the general principles of the invention.

In accordance with an embodiment of the present invention, the systems and methods described incorporate all essential networking features, including, but not limited to, an Ethernet connection, an operating system, a server, a full TCP/IP protocol stack and encryption capability for secure communications.

To facilitate an understanding of the preferred embodiment, the general architecture and operation of a host system (or PC) will be described. The specific architecture and operation of the preferred embodiment will then be described with reference to the general architecture of the host system and host controller.

Figure 1A:
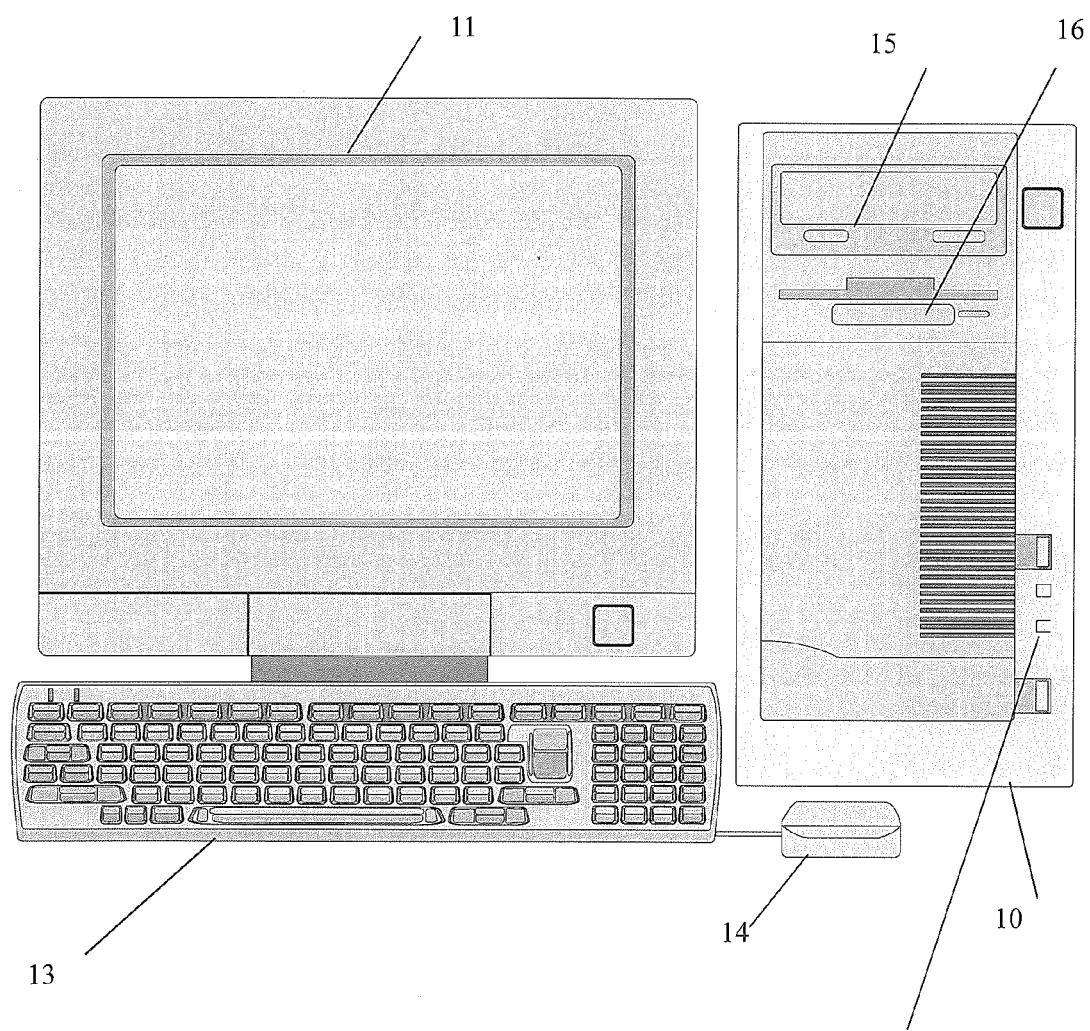
FIG. 1A shows a block diagram of a host computing system, used in accordance with an embodiment of the present invention.

FIG. 1A is a block diagram of a computing system ("PC") for executing computer executable process steps according to one aspect of the present invention. FIG. 1 includes a host computer 10 and a monitor 11. Monitor 11 may be a CRT type, a LCD type, or any other type of color or monochrome display. Also provided with computer 10 are a keyboard 13 for entering data and user commands, and a pointing device 14 for processing objects displayed on monitor 11.

Computer 10 includes a computer-readable memory medium such as a rotating disk 15 for storing readable data. Besides other programs, disk 15 can store application programs including web browsers by which computer 10 connects to the Internet and the systems described below.

According to one aspect of the present invention, computer 10 can also access computer-readable floppy disks storing data files, application program files, and computer executable process steps embodying the present invention or the like via a floppy disk drive 16. A CD-ROM, or CD R/W (read/write) interface (not shown) may also be provided with computer 10 to access application program files, audio files and data files stored on a CD-ROM.

A modem, an integrated services digital network (ISDN) connection, or the like also provides computer 10 with an Internet connection 12 to the World Wide Web (WWW).

It is noteworthy that the present invention is not limited to the FIG. 1A architecture. For example, notebook or laptop computers, handheld devices, set-top boxes or any other system capable of running computer-executable process steps, as described below, may be used to implement the various aspects of the present invention.

Figure 1B:
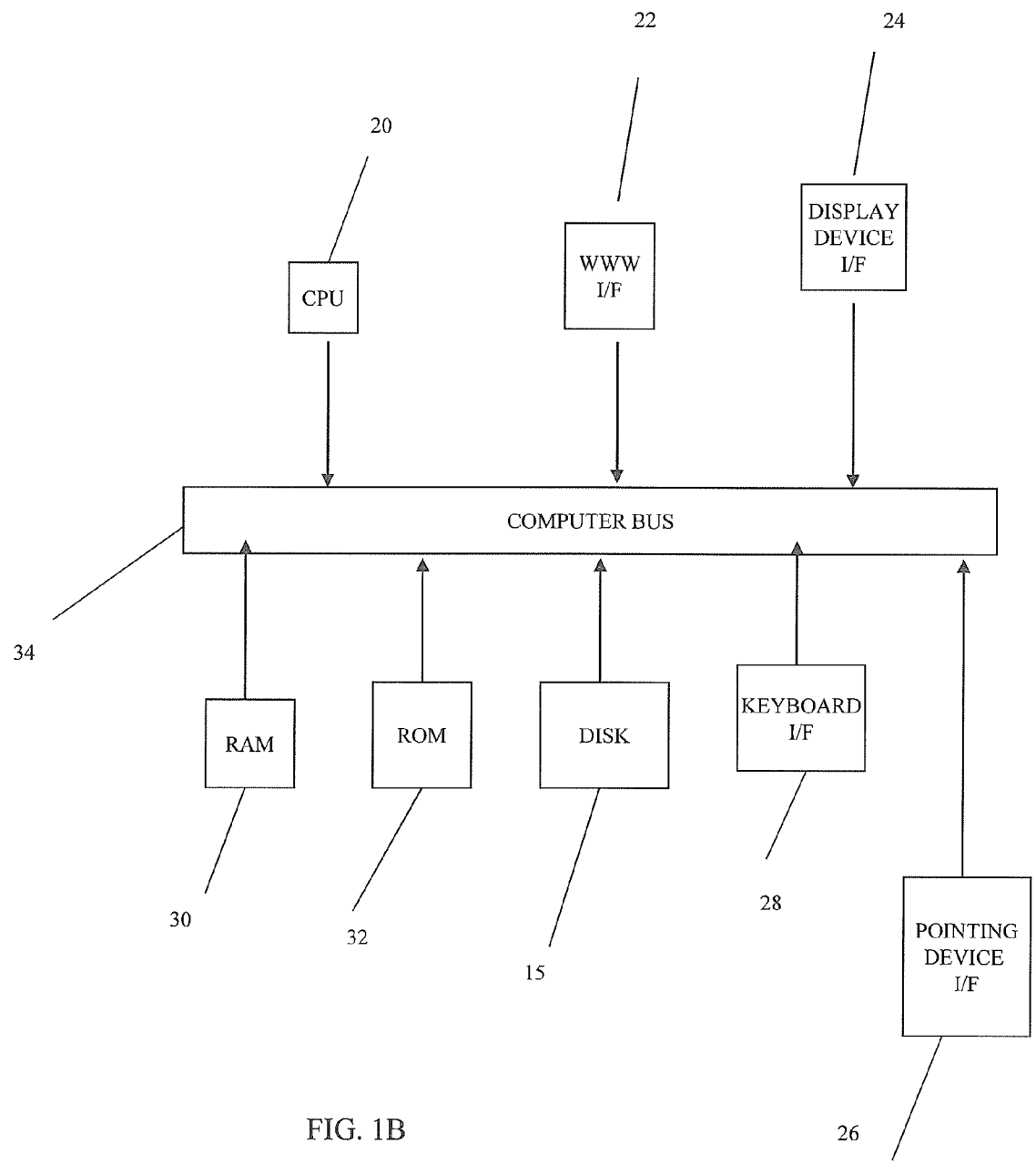
FIG. 1B shows the top-level architecture of the host computing system in FIG. 1A.

FIG. 1B is a block diagram showing the internal functional architecture of computer 10. As shown in FIG. 1B, computer 10 includes a central processing unit ("CPU") 20 for executing computer-executable process steps and interfaces with a computer bus 34. Also shown in FIG. 1B are a WWW interface 22 (also shown as network interface card 114 in FIG. 1D), a display device interface 24, a keyboard interface 28, a pointing device interface 26, and a rotating disk 15.

As described above, disk 15 stores operating system program files, application program files, web browsers, and other files. Some of these files are stored on disk 15 using an installation program. For example, CPU 20 executes computer-executable process steps of an installation program so that CPU 20 can properly execute the application program.

Random access memory ("RAM") 30 also interfaces to computer bus 34 to provide CPU 20 with access to memory storage. When executing stored computer-executable process steps from disk 15 (or other storage media such as floppy disk 16 or WWW connection 12), CPU 20 stores and executes the process steps out of RAM 30.

Read only memory ("ROM") 32 is provided to store invariant instruction sequences such as start-up instruction sequences or basic input/output operating system (BIOS) sequences for operation of keyboard 13.

The following provides a brief description of the Internet that may be used to receive and send data using the redirector software module of the present invention.

The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, for example, Extensible Markup Language as published by W3C Consortium, Version 1, Second Edition, October 2000, ©W3C may also be used. The collection of all such publicly available computer files is known as the World Wide Web (WWW). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, for example, Earthlink. The web browser may run on any computer connected to the Internet. Currently, various browsers are available of which two prominent browsers are Netscape Navigator and Microsoft Internet Explorer. The Web Browser receives and sends requests to a web server and acquires information from the WWW. A web server is a program that, upon receipt of a request, sends the requested data to the requesting user.

A standard naming convention known as Uniform Resource Locator ("URL") has been adopted to represent hypermedia links and links to network services. Most files or services can be represented with a URL. The URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP. The transfer format for standard WWW pages is Hypertext Transfer Protocol (HTTP).

Figure 1C:
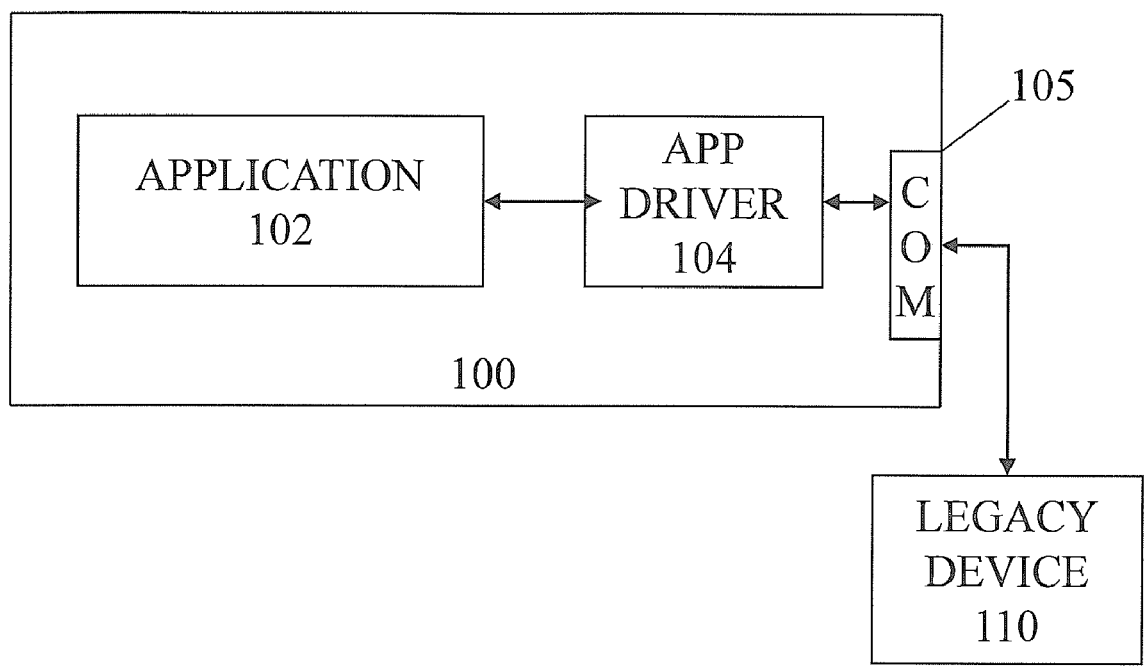
FIG. 1C shows a top-level block diagram showing connectivity between a host system and a legacy device in accordance with an embodiment of the present invention.

FIG. 1C shows a host system 100 (similar to computing system 10, FIG. 1A) including a consumer application module 102, an application driver 104 coupled to a legacy device 110. Consumer application module 102 may include various types of application software that can communicate with legacy device 110 via serial port 105.

As shown in FIG. 1C, consumer application module 102 is designed to initiate communication through application driver 104 to legacy device 110 via a serial COM port 105. This system configuration is used to provide direct communication capability for transferring data between host system 100 and legacy device 110 without regard to networking capability or the security of the data being transferred.

Figure 1D:
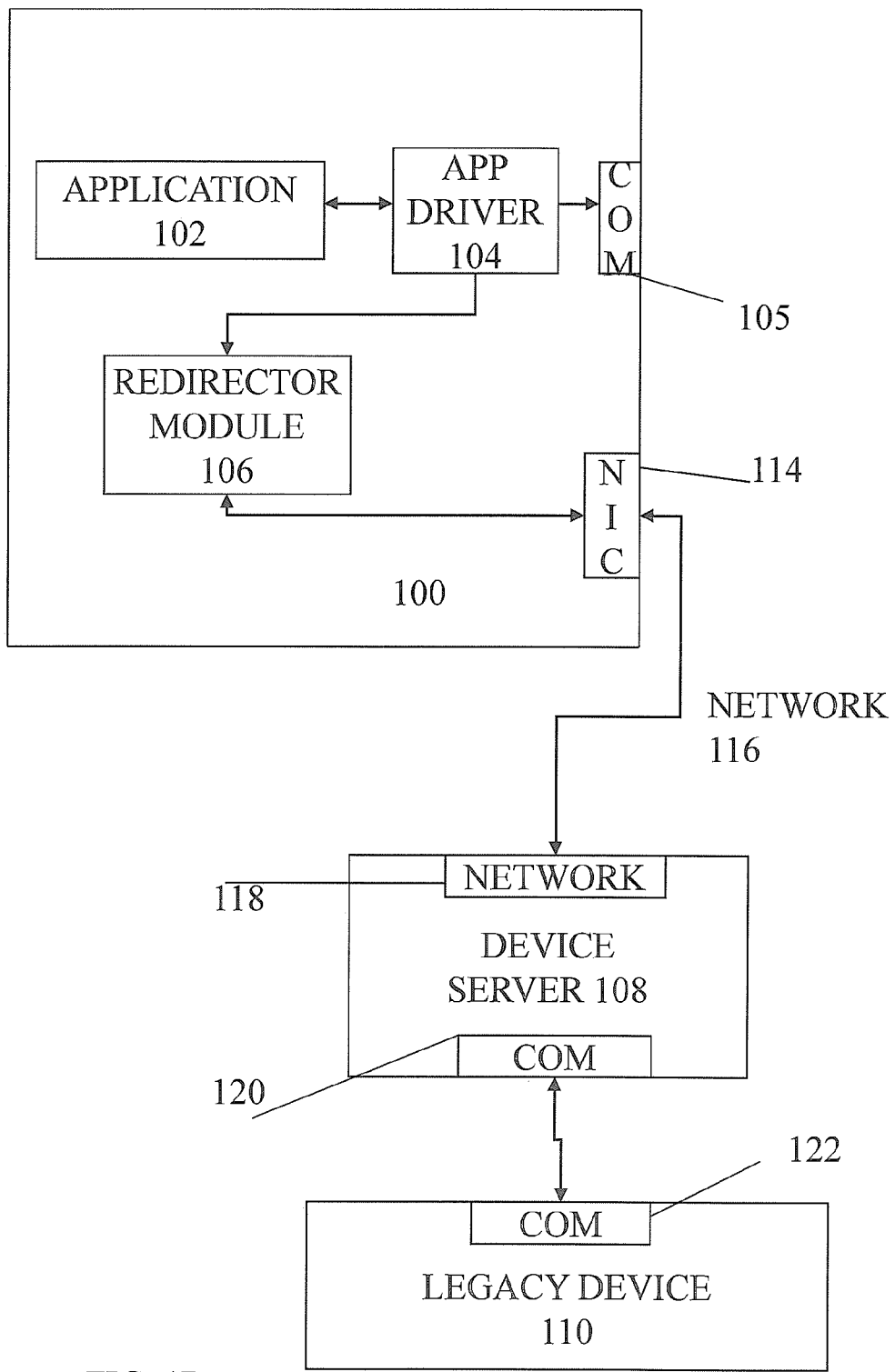
FIG. 1D shows a top-level block diagram showing connectivity between a host system having a redirector software module, and a legacy device in accordance with an embodiment of the present invention.

FIG. 1D shows a system configuration in accordance with an embodiment of the present invention that allows secured communication between consumer application module 102 and legacy device 110 using a redirection approach.

In this embodiment, redirector module 106 is used to "intercept" a data signal destined for serial COM port 105 from consumer application module 102, secure the data and redirect it through a network interface card (NIC) 114 to a legacy device 110 via network 116, for example, local area network, wireless network, Internet or any other network. Legacy device 110 is coupled to a device server/embedded system 108 that has a local serial port 120 and a network port 118, as discussed below in detail.

Figure 2:
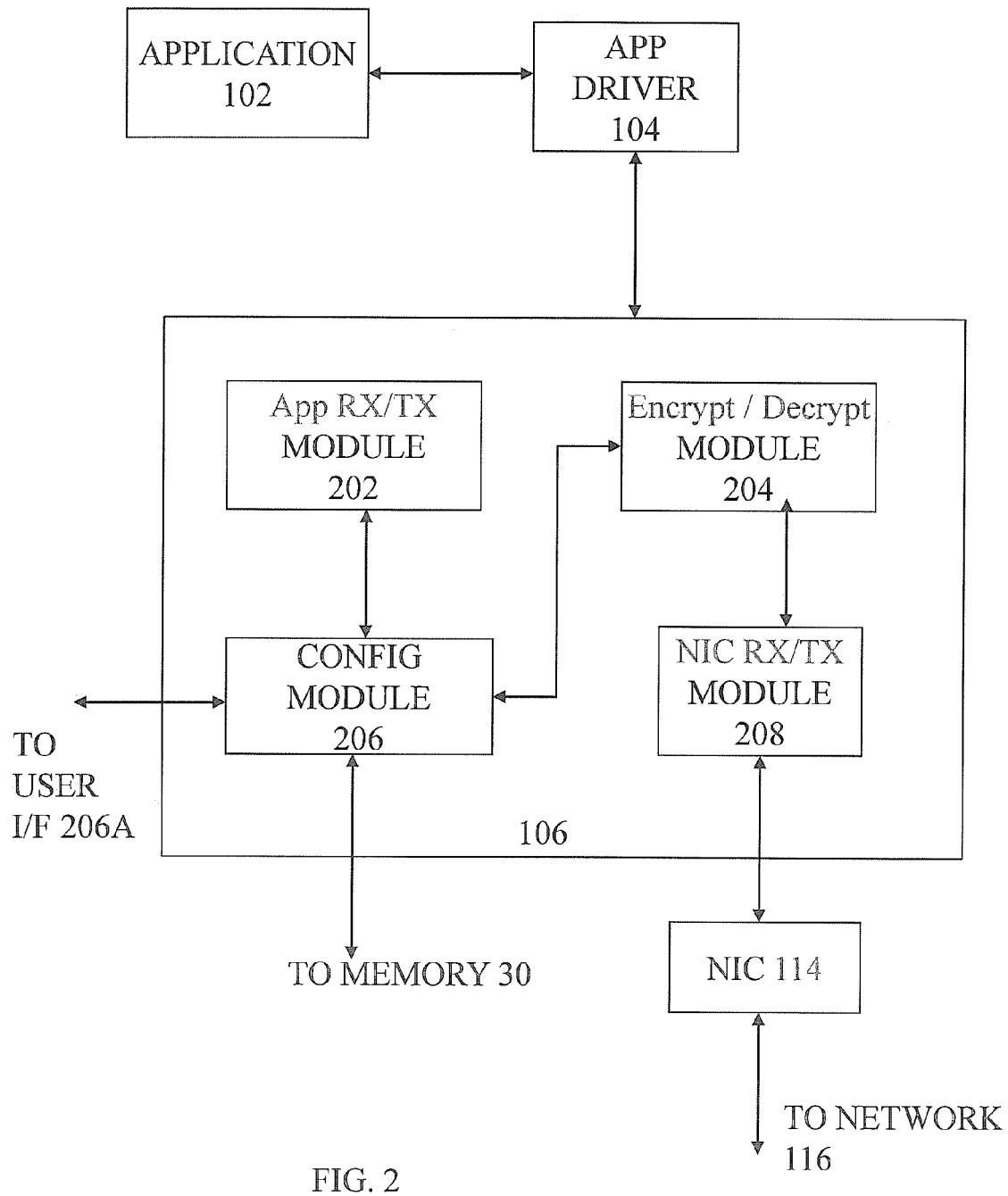
FIG. 2 is top level block diagram of a redirector module in accordance with an embodiment of the present invention.

FIG. 2 is top-level block diagram of redirector module 106 in accordance with an embodiment of the present invention. In this embodiment, redirector module 106 includes an application receive/transmit module ("App RX/TX module") 202, encryption/de-cryption module ("referred to as "encrypt module") 204, configuration module 206 and network interface receive/transmit module ("NIC Rx/Tx module") 208.

In one embodiment, consumer application module 102 generates data that is destined for serial COM port 105 local to host system 100. The generated data is re-directed to App Rx/Tx module 202 instead.

Configuration module 206 is launched by a host system user, when a user desires to map COM port 105 to a network (via user interface 206A) to cause application 102 data to be redirected from the serial COM port 105 to the network port that maps to an Ethernet address and port number pair. Configuration module 206 maps serial COM port 105 to the network port (for NIC 114).

App RX/TX module 202 accepts application 102 data and determines the particular COM port option. App RX/TX module 202 accepts the input data in any format, binary or ASCII data.

App RX/TX module 202 determines whether the input data needs to be encrypted or decrypted depending on the direction of data flow and if the user has enabled this feature.

After the COM port is properly mapped, every time consumer application 102 reads, writes, or sets options on serial COM port 105, it is directed to the specified network port with a given Ethernet address.

In one embodiment, encrypt/decrypt module 204 encrypts application 102 data using an encryption algorithm. Alternatively, encrypt/decrypt module 204 decrypts the encrypted data that is received from device server 108. Various techniques may be used to secure data, for example, the Secured Sockets Layer ("SSL") protocol; Secure Shell ("SSH") or the Advanced Encryption Standard ("AES"), which are incorporated herein by reference in their entirety or any other encryption standard or protocol.

NIC RX/TX module 208 moves the encrypted/decrypted data depending on the direction of data flow. NIC RX/TX module 208 delivers or receives the encrypted/decrypted data to or from the Ethernet via NIC 114.

Figure 3:
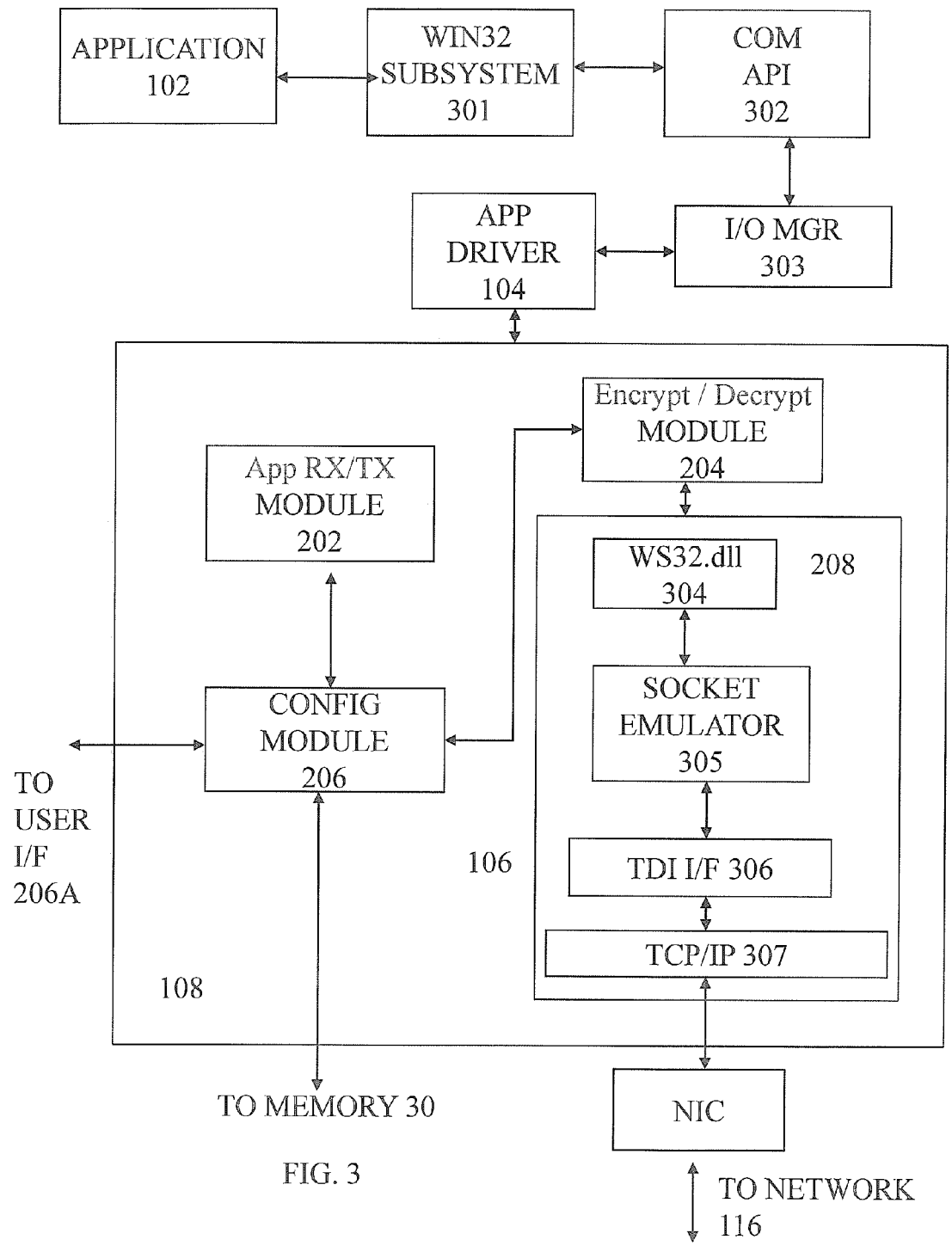
FIG. 3 is another block diagram of the redirector software module in accordance with an embodiment of the present invention.

FIG. 3 is a detailed block diagram representing data flow from host 100 to legacy device 110 in a Windows® operating system environment, in one aspect of the present invention. It is noteworthy that the adaptive aspects of the present invention are not limited to the Windows® environment and may be used under any operating system.

Application 102 is a communication application that is used to communicate with legacy device 110. In accordance with an embodiment of the present invention, application 102 initiates standard operations, such as open, close, read, write and input/out control ("IOCTL") operations. In one embodiment, application 102 includes/communicates with a Win 32 Sub system 301, Win32 Com API (an application programming interface) 302 and an input/output (I/O) manager 303. The operation of modules 301, 302 and 303 is well known to those of ordinary skill in the art. In one embodiment, when application 102 is ready to send data, it calls COM API 302 to communicate with the application driver 104, which drives serial COM port 105. Redirector module 106 intercepts the packet data and then processes it accordingly.

Redirector module 106 is an auxiliary module to application driver 104 and provides an additional interface for redirecting data from serial COM port 105 to the NIC 114.

In one embodiment, redirector module 106 may be a Windows® 9X driver, which uses Virtual Device Driver (VDD) with the driver being designated with the extension .vxd. In other embodiments, redirector module 106 can be used with Windows® NT, Windows® 2000, Windows® XP and Windows® 2003, using the Win32 driver model or a close approximation thereof. This type of driver application has the signature extension of .sys. In one embodiment, redirector module 106 is a Windows Socket application.

In one embodiment, data from application 102 is redirected from in-band and out-band control data from Ring 0 kernel layer to Ring 3 user mode layer using, for example, event based processing.

In one embodiment, redirector module 106 provides two functions. The first function includes opening a new process thread to setup and wait for a data packet send event. The second function includes communicating with a Windows Socket API 304, for example, WS32.dll.

Redirector module 106 launches a Delayed Procedure Call (DPC) to wake up after a certain time, for example, every 100 nano seconds, to check if the data packet is available. Redirector module 106 returns an IRP with the status of "pending." This causes the I/O manager 303 to wait until the data packet has been received before returning to the user.

Redirector service module 306 includes an event handler, which is called by a signaled event to copy data from the Ring 0 layer to the Ring 3 layer.

After the data is copied, the Windows socket ("Winsock") interface 304 takes over the data and passes it down to a Socket Emulator 305. The Winsock function completes the data transmission. Data is passed through a transport driver interface 306 to a TCP/IP stack 307 and then via NIC 114 to network 116. Modules 304 through 307 are standard components well known to those skilled in the art.

Alternatively, when the data packet comes in from legacy device 110 on the network, redirector module 106 performs a back channel write IOCTL with the data. This operation wakes the DPC, which copies the data into a buffer (not shown) and signals the I/O manager 303 that the data packet is available.

Referring again to FIG. 1D, device server 108 receives and sends data to and from legacy device 110. Data that is received from legacy device 110 (via COM Port 122) is secured by device server 108 and transmitted to host system 100. Device server 108 includes two modular connectors 118 and 120. Connector 118 provides physical connectivity with host system 100 and includes a network port. Connector 120 operationally couples device server 108 with legacy device 110 and includes an RJ-45 jack and a serial COM port.

In one embodiment, dual port random access memory is provided to both connectors 118 and 120 to execute process steps, according to one aspect of the present invention. Data is received from redirector module 106 and is moved to connector 118. Thereafter, data exchange takes place between connector 118 and 120. In one aspect, data is secured in connector 118 and then transmitted as secure data.

The adaptive aspects of device server 108 are not limited to any particular encryption/decryption technique, protocol or standard. Device server 108 may be configured to use any encryption techniques, such as from SSL to SSH to AES.

In an exemplary operational embodiment, encrypt/decrypt module 204 (FIG. 2) of redirector module 106, and device server 108 are setup to use AES. Encrypt/decrypt module 204 is implemented as an AES client while secure device server 108 is implemented as an AES server. In this embodiment, the user turns on AES, selects the size of the key and types the same encryption key for encrypt/decrypt module 204 and device server 108. AES on the encrypt/decrypt module 204 is set up on a per port basis. Only the ports connected to AES device server 108 can use AES.

When a connection on the AES redirected port is opened a random initialization string is sent to device server 108. The length of the string depends upon the size of the key. Device server 108 "swallows" the initialization string and does not forward it to legacy device 110. Thereafter, all of the data that is now exchanged between host system 100 and device server 108 is encrypted. Encrypt/decrypt module 204 of redirector 106 encrypts all data bound to device server 108 and decrypts all data received from device server 108.

It is noteworthy that if device server 108 does not need to provide a secure data channel, it merely passes TCP/IP packets from redirector module 106 to legacy device 110.

An example of a secure device server is the XPort™ commercially available through Lantronix Inc. and is disclosed in U.S. patent application Ser. No. 10/896,088, entitled "Secure Data Transfer Using an Embedded System," filed Jul. 21, 2004, which is herein incorporated by reference in its entirety.

Figure 4:
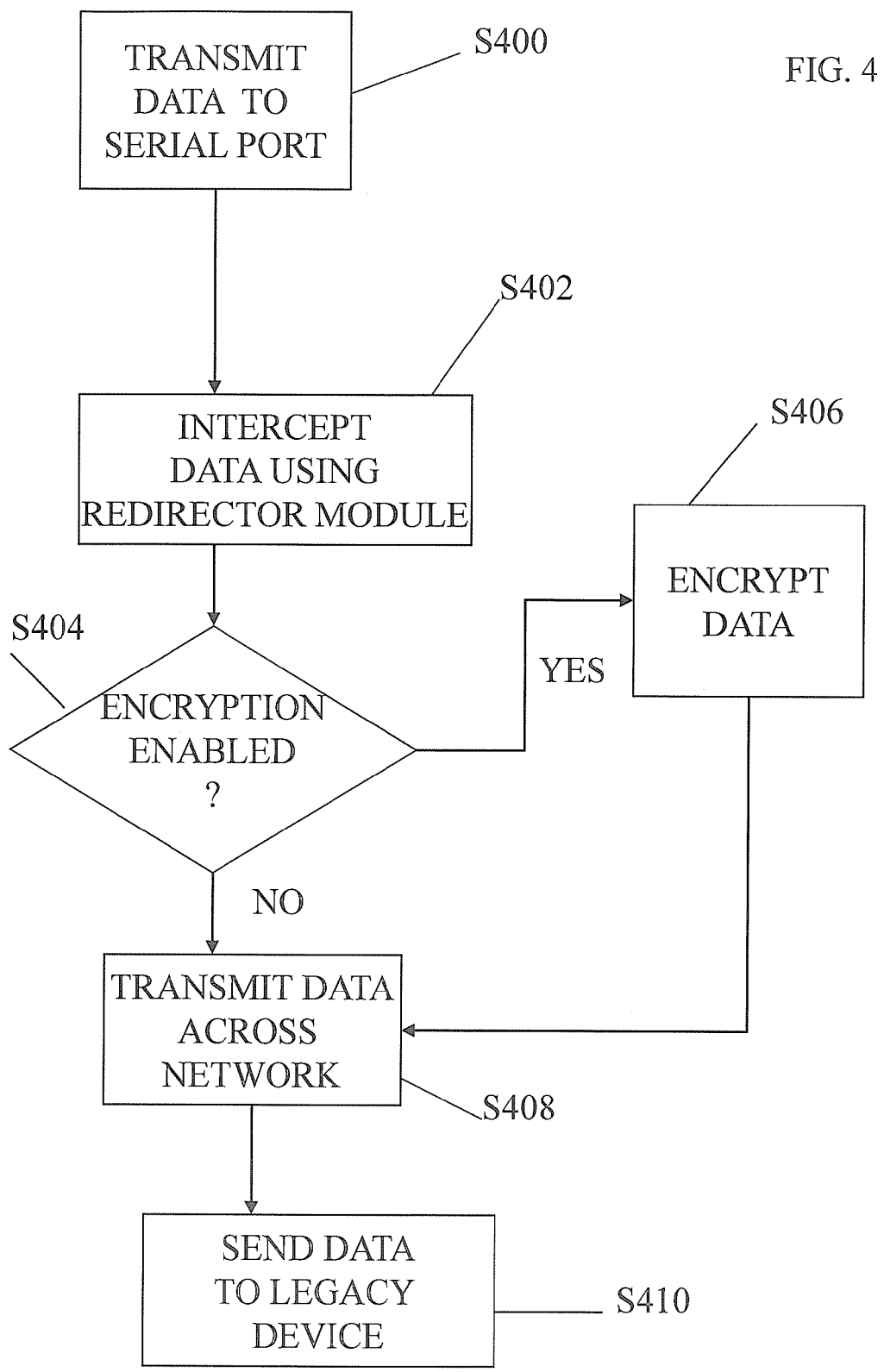
FIGS. 4 and 5 show process flow diagrams for executing a process in accordance with an embodiment of the present invention.

FIG. 4 shows a process diagram for executing process steps, according to one aspect of the present invention, for moving data from host system 100 to legacy device 110.

In step s400, consumer application 102 sends data through application driver 104 destined for serial COM port 105.

In step s402, redirector module 106 intercepts the data.

In step s404, redirector module 106 determines if the intercepted data must be encrypted. If so, in step s406, redirector software module 106 encrypts the data using an encryption algorithm.

In step s408, data is transmitted across the Ethernet network using, for example, TCP/IP. Advantageously, the redirection is transparent to consumer application 102, which continues to perform as if it were communicating to serial COM port 105.

In step s408, the redirected data is directed to device server 108 out on the network. Device server 108 is capable of decrypting the data.

In step s410, device server 108 presents the decrypted data though local server COM port 120 to legacy device 110.

Figure 5:
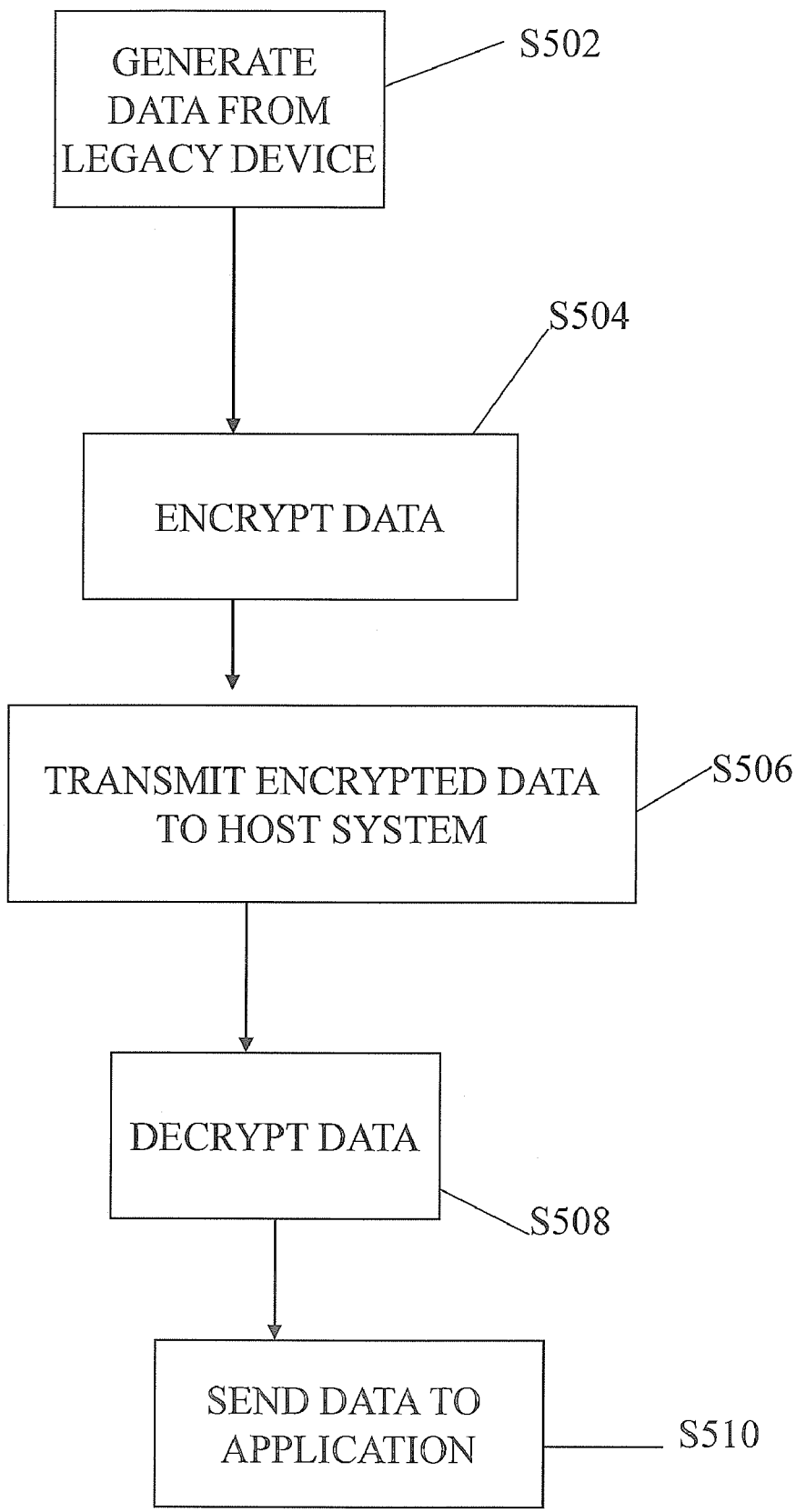

FIG. 5 shows a process diagram for executing process steps, according to one aspect of the present invention, for moving data from legacy device 110 to host system 100.

In step s502 data is generated in legacy device 110 and provided to local server COM port 120.

In step s504 the data from attached legacy device 110 can be encrypted by device server 108.

In step s506 the data is directed back to redirector module 106 via the network. Redirector module 106 receives the data and, if necessary, in step s508, decrypts the data.

In step S510, the decrypted data is presented to consumer application 102 on host system 100 as if the data had arrived via serial COM port 105.

It is noteworthy that although the foregoing description has used Ethernet to illustrate the adaptive aspects of the present invention, an Ethernet to Wireless implementation may also be used to transmit data.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for transmitting data over a network that is operationally coupled to a legacy device and a local host system, comprising:

transmitting application data from an application on the host system destined for a first serial port on the host system;

waiting for a data packet send event corresponding to the application data;

intercepting the application data on the host system;

signaling, by a redirector, the data packet send event indicating the application data is available for transmission;

upon detecting the data packet send event signal corresponding to the data packet send event, transmitting the application data over a network interface toward the legacy device via a Socket Application Programming Interface (SAPI);

receiving device data originating from the legacy device via the SAPI;

upon determining the device data from the legacy device is encrypted, decrypting the data; and transmitting the decrypted data to the application in the host system.

2. The method of claim 1, wherein the received device data is based on TCP format.

3. The method of claim 1, wherein the received device data is based on UDP format.

4. A system for transmitting data over a network that is operationally coupled to a legacy device and a local host system, comprising:

a processor capable of executing the steps of;

generating a data transmission for a first communication port, the data transmission including application data from at least on application on the local host system;

intercepting the application data and upon determining the application data is to be encrypted, encrypting the application data;

redirecting the application data from the first communication port to a network port;

securing the application data via a secure protocol with a device other than the legacy device;

transmitting the application data toward the legacy device via the secure protocol;

causing an I/O manager mapped to the application to wait for a signal that a data packet is available, the data packet including device data originating from the legacy device;

performing a back channel write with the device data as the signal to the I/O manger mapped to the application when said data packet is available; and sending the device data to the application via the I/O manager mapped to the application.

5. The method of claim 1, wherein the step of waiting for the data packet send event includes opening a process thread on the host system to wait for the data packet send event.

6. The method of claim 1, wherein the step of decrypting the device data includes decrypting the device data according to a secure protocol.

7. The method of claim 6, wherein the secure protocol utilizes at least one of the following: an advanced encryption standard, a secured socket layer, and a secure shell.

8. The system of claim 4, wherein the secure protocol utilizes at least one of the following: an advanced encryption standard, a secured socket layer, and a secure shell.

9. The system of claim 4, wherein the processor is further capable of causing the I/O manager to wait by launching a delayed procedure call.

10. The system of claim 9, wherein the processor is further capable waking the delayed procedure call after a defined amount of time.

11. The system of claim 4, further comprising a device server configured to couple with the legacy device and support the secure protocol.

12. The system of claim 11, wherein the device other than the legacy device is the device server.

* * * * *